(12) United States Patent
Kato et al.

(10) Patent No.: US 7,126,634 B2
(45) Date of Patent: Oct. 24, 2006

(54) IMAGE PROCESSING SYSTEM, IMAGE PICKUP APPARATUS AND IMAGE PROCESSING APPARATUS

(75) Inventors: Koichi Kato, Hamamatsu (JP); Makoto Suzuki, Hamamatsu (JP); Yukio Fujita, Kakegawa (JP); Yuichi Hirama, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 924 days.

(21) Appl. No.: 10/201,517

(22) Filed: Jul. 23, 2002

(65) Prior Publication Data

US 2003/0021469 A1 Jan. 30, 2003

(30) Foreign Application Priority Data

Jul. 26, 2001 (JP) .................. P. 2001-226120

(51) Int. Cl.
H04N 3/14 (2006.01)
H04N 5/335 (2006.01)
H04N 9/04 (2006.01)
H04N 9/083 (2006.01)

(52) U.S. Cl. .................................. 348/279

(58) Field of Classification Search ................ 348/266, 348/272, 273, 279, 453, 488
See application file for complete search history.

(56) References Cited

U.S. PATENT DOCUMENTS

| | | | | |
|---|---|---|---|---|
| 3,889,288 A | * | 6/1975 | Rennick | 348/455 |
| 3,982,274 A | * | 9/1976 | Chai | 348/280 |
| 4,470,076 A | | 9/1984 | Arai et al. | |
| 4,827,331 A | | 5/1989 | Nakamura et al. | |
| 4,891,696 A | * | 1/1990 | Miyazaki | 348/71 |
| 4,992,854 A | * | 2/1991 | Aso et al. | 348/266 |
| 5,136,370 A | * | 8/1992 | Chi | 348/279 |
| 5,278,660 A | * | 1/1994 | Sugiki | 348/281 |
| 5,548,325 A | * | 8/1996 | Hashimoto et al. | 348/220.1 |
| 5,581,298 A | | 12/1996 | Sasaki et al. | |
| 5,737,017 A | * | 4/1998 | Udagawa et al. | 348/273 |
| 6,373,523 B1 | * | 4/2002 | Jang | 348/273 |
| 6,747,693 B1 | * | 6/2004 | Yamashita et al. | 348/242 |
| 7,068,314 B1 | * | 6/2006 | Nakajima et al. | 348/273 |
| 2006/0038914 A1 | * | 2/2006 | Hanada et al. | 348/362 |

FOREIGN PATENT DOCUMENTS

| | | |
|---|---|---|
| EP | 0 415 798 A2 | 3/1991 |
| FR | 2 593 989 | 8/1987 |
| JP | 04137891 A * | 5/1992 |
| JP | 06153215 A * | 5/1994 |
| JP | 08251604 A * | 9/1996 |
| JP | 11-78692 | 3/1999 |

* cited by examiner

Primary Examiner—Vivek Srivastava
Assistant Examiner—Jason Whipkey
(74) Attorney, Agent, or Firm—Pearne & Gordon LLP (57) ABSTRACT

The image processing system includes: an image pickup apparatus (10) including image pickup elements of a color difference line sequential system that outputs, as video signals, a luminance signal (Y) and a line sequential, color difference signal (U/V); and an image processing apparatus (20) which includes a signal interpolator (21) for interpolating the line sequential color difference signal (U/V) to separate the line sequential color difference signal (U/V) into two color difference signals (V) and (U). With this configuration, only two video signal lines are required to connect the image pickup apparatus (10) and the image processing apparatus (20), and even though the number of signal lines is reduced, image quality deterioration is suppressed.

6 Claims, 5 Drawing Sheets

FIRST FIELD n LINE

| Ye + Mg | Cy + G | Ye + Mg | Cy + G | ........ |
|---|---|---|---|---|
| 1 | 2 | 3 | 4 | |

FIG. 5B

FIRST FIELD n + 1 LINE

| Ye + G | Cy + Mg | Ye + G | Cy + Mg | ........ |
|---|---|---|---|---|
| 1 | 2 | 3 | 4 | |

FIG. 5C

SECOND FIELD n LINE

| Ye + Mg | Cy + G | Ye + Mg | Cy + G | ........ |
|---|---|---|---|---|
| 1 | 2 | 3 | 4 | |

FIG. 5D

SECOND FIELD n + 1 LINE

| Ye + G | Cy + Mg | Ye + G | Cy + Mg | ........ |
|---|---|---|---|---|
| 1 | 2 | 3 | 4 | |

IMAGE PROCESSING SYSTEM, IMAGE PICKUP APPARATUS AND IMAGE PROCESSING APPARATUS

BACKGROUND OF THE INVENTION

The present invention relates to an image processing system wherein an image obtained by an image pickup apparatus is transmitted to and processed by an image processing apparatus. In particular, the present invention pertains to an appropriate image processing system for reducing the number of signal lines required for a connection between an image pickup apparatus and an image processing apparatus, as well as for suppressing the deterioration of an image quality, and an image pickup apparatus and an image processing apparatus that constitute this image processing system.

In an image processing system wherein an image obtained by a camera (an image pickup apparatus) is transmitted to an image processing system, the camera is connected to this image processing apparatus by signal lines so that the camera may be located at a distance from the image processing apparatus. An image processing system disclosed in Japanese Patent Publication No. Hei. 11-78692 respectively provides for the mounting of multiple cameras on the front, the rear, the left and the right side of a vehicle, and for a single image processing apparatus to be employed that fetches and synthesizes the images obtained by these cameras. For this conventional image processing system, the transmission to the image processing system of video data obtained by the cameras is performed using an arbitrary transmission method, such as RGB or YUV, or Y/C separation video or composite video.

When all video data acquired by an image pickup element, such as a CCD used for a digital camera, are to be transmitted to an image processing system, the video data are converted into RGB signals or YUV signals by the camera and the resultant signals are output to the image processing apparatus. In this case, since video data for each color element are output by the camera to the image processing apparatus, a total of three transmission paths (signal lines) are required.

To effect a reduction in the number of required signal lines, methods such as Y/C separation video and composite video are available. With the first method, two paths are required for the transmission of data, while with the second method, one path is required. However, since when these methods are employed, the amount of data that is transmitted for an image is reduced from that which is acquired by an image pickup element, and the quality of the image, when it is subsequently reproduced, is deteriorated.

When transmission along two paths is to be preformed without a reduction in the amount of data, a point sequential system for alternately transmitting a color difference U/V signal for each pixel is employed. According to the point sequential system, since a color mixture occurs when the U/V separation timing is shifted at the reception time, accurate timing management is indispensable. Therefore, when the point sequential system is employed for a monitoring system, or a vehicle-mounted system, for transmitting data a long distance of several meters to several tens of meters, deterioration of the signal occurs and using the system is difficult.

Three transmission paths are required for the transmission of a high quality video signal. However, this involves an increase in the number of lines, and the transmission at a long distance is indispensable for the application to the monitoring system, so that the costs for laying long cables would be increased. Further, as is disclosed in Japanese Patent Publication No. 11-78692, for an image processing system for which multiple cameras are mounted on a vehicle, because the available mounting space is severely limited, it is imperative that the number of signal lines and the size of the apparatus be reduced. This is especially true when multiple cameras are employed for a monitoring or a vehicle mounted system, since then, either multiple scenes are alternately displayed or multiple images are synthesized and the resulting image is displayed or recorded. As a result, therefore, when the number of cameras is increased, the accompanying increase in the number of video signal transmission paths and in the size of the processing circuit constitute a formidable problem.

Specifically, when for a conventional image processing system all video data acquired by cameras are to be transmitted to an image processing apparatus, the number of signal transmission lines that are required is increased, as are the number of circuits in the image pickup apparatus and the size of the video signal input/output section of the image processing apparatus. This problem becomes evermore apparent as the number of mounted cameras is increased.

SUMMARY OF THE INVENTION

To resolve these problems, it is one objective of the present invention to provide an image processing system that can satisfactorily transmit and process video data along two transmission paths, which is fewer than is conventionally required, and an image pickup apparatus and an image processing apparatus that constitute the image processing system.

To achieve this objective, an image processing system comprises:

an image pickup apparatus, including an image pickup element for the color difference, line sequential system that are mounted, for outputting a video signal as a luminance signal and a line sequential, color difference signal; and an image processing apparatus, including a signal interpolator for interpolating the line sequential, color difference signal that is output by the image pickup apparatus, and for separating the interpolation signal into two color difference signals. To display an image, the image processing apparatus preferably includes an image display device that uses the luminance signal and the color difference signals obtained through the interpolation.

With this arrangement, the number of signal lines used to connect a single image pickup apparatus and an image processing apparatus can be reduced to two, and since the line sequential, color difference signal is employed, the deterioration of an image signal can be suppressed, and a high quality image can be displayed.

Furthermore, to achieve the objective, an image processing system comprises:

multiple image pickup apparatuses, including an image pickup element of the color difference, line sequential system, are mounted for outputting video signals as luminance signals and line sequential, color difference signals; and an image processing apparatus, which includes a signal interpolator for receiving the video signals from the multiple image pickup apparatuses, for interpolating the line sequential, color difference signals that are received and for separating each of the interpolation signals into two color difference signals, and an image synthesis device, for synthesizing video data obtained from the multiple image pickup apparatuses by using the color signals acquired by the signal interpolator.

With this arrangement, even when the number of mounted image pickup apparatus is increased, the total number of signal lines used to connect the image pickup apparatuses and the image processing apparatus can be reduced, and many image pickup apparatuses can be installed, even in a small space.

Preferably, the image pickup apparatus includes:

a signal interpolator for interpolating the line sequential, color difference signals that are output by the image pickup apparatuses;

a video signal processing apparatus for adjusting the color difference signals obtained through the interpolation; and a line sequential device for performing the line sequential process for the color difference signals that have been adjusted. More preferably, in the line sequential process, the line sequential device removes a signal prepared by the signal interpolator.

With this arrangement, various processing forms can be employed by the line sequential device; i.e., a processing form can be selected that is appropriate for obtaining the optimal image quality, or one can be selected that is suitable for the cost, and the degree of freedom available with the system can be increased. Further, various processing forms can be employed by the video signal processing device, and the white balance can adjusted by the image pickup apparatus.

In addition, to achieve the objective, an image pickup apparatus, on which an image pickup element is mounted for a color difference line sequential system, comprises:

means for outputting an obtained video signal as two separate signal types, a luminance signal and a line sequential, color difference signal. With this arrangement, the image pickup apparatus requires only two output signal lines.

To achieve this objective, an image pickup apparatus, on which an image pickup element are mounted for a color difference line sequential system, comprises:

a signal interpolator for interpolating a line sequential, color difference signal that is output by the image pickup apparatus, and for splitting the color difference signal to obtain two color difference signals;

a video signal processing apparatus for adjusting the two color difference signals obtained through the interpolation; and a line sequential device for performing the line sequential process for the two color difference signals that have been adjusted to obtain one color difference signal. With this arrangement, an image pickup apparatus that requires only two output signal lines can be provided, and the image quality of the video signal output by the image pickup apparatus can be selected by using the line sequential device.

Moreover, to achieve this objective, provided is an image processing apparatus, for performing image processing for a video signal received from an image pickup apparatus, on which an image pickup element having a color difference line sequential system is mounted, that outputs the video signal as a luminance signal and a line sequential, color difference signal, wherein also mounted is a signal interpolator for interpolating the line sequential, color difference signal so as to obtain two separate color difference signals.

With this arrangement, the image processing apparatus for the assembly can be connected to the image pickup apparatus that outputs an obtained video signal as two separate signal types, i.e., a luminance signal and a line sequential, color difference signal. Thus, the number of signal lines can be reduced.

DETAILED DESCRIPTION OF THE PREFERRED EMBODIMENT

The preferred embodiments of the present invention will now be described while referring to the drawings.

Figure 1:
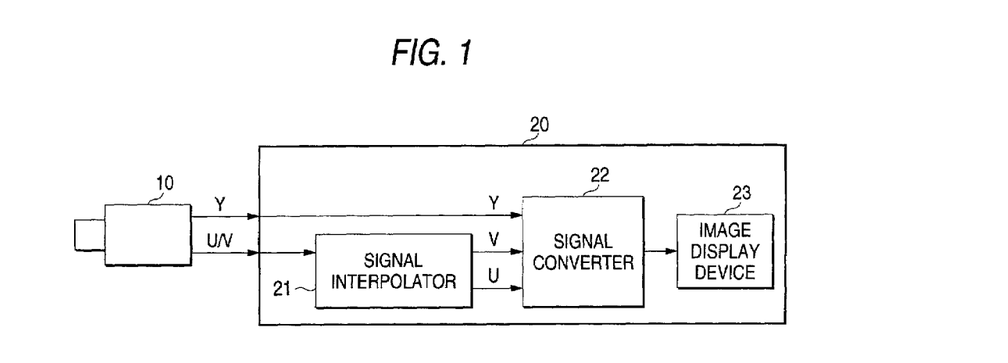
FIG. 1 is a block diagram showing an image processing system according to a first embodiment of the present invention.

FIG. 1 is a diagram showing the configuration of an image processing system according to a first embodiment of the present invention. The image processing system of this embodiment includes an image pickup apparatus (camera) 10 and an image processing apparatus 20 that are connected by two signal lines. One of the signals that is transmitted is a luminance signal Y for an obtained image, while the other signal is a line sequential, color difference signal U/V, which will be described later.

In order to fetch and perform image processing for a video signal that is obtained by the image pickup apparatus 10, the image processing apparatus 20 includes: a signal interpolator 21 for interpolating a color difference signal U/V received from the image pickup apparatus 10, and for preparing color difference signals U and V for each pixel element; a signal converter 22 for converting into video signals the luminance signal Y received from the image pickup apparatus 10, and the color difference signals U and V received from the signal interpolator 21; and an image display device 23 for displaying the video signals output by the signal converter 22.

Figure 2:
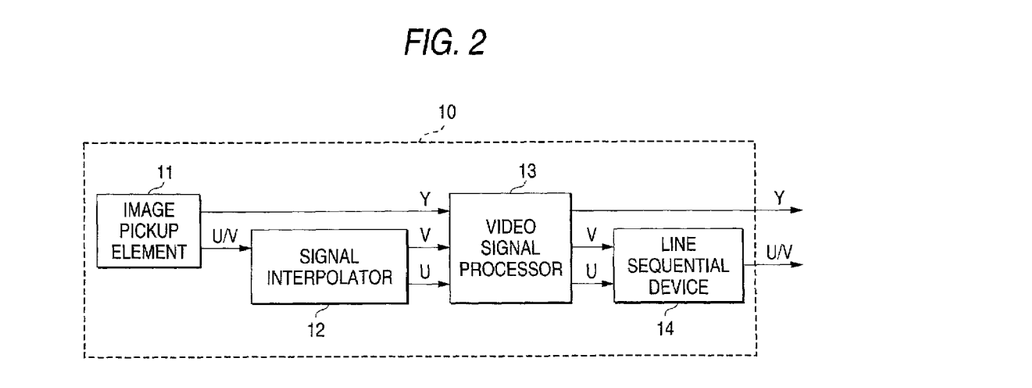
FIG. 2 is a diagram showing the internal structure of an image pickup apparatus according to the first embodiment of the present invention.

FIG. 2 is a detailed diagram showing the configuration of the image pickup apparatus 10 in FIG. 1. The image pickup apparatus 10 includes: an image pickup element 11 of a color difference line sequential system; a signal interpolator 12 for interpolating a line sequential, color difference signal U/V output by the image pickup element 11, and for preparing signals for color differences U and V for each pixel element; a video signal processor 13 for adjusting the white balance for the signal output by the signal interpolator 12; and a line sequential device 14 for removing from the signals adjusted by the video signal processor 13 the signals prepared by the signal interpolator 12, and for arranging the signals U and V in the line sequential order.

Figure 3:
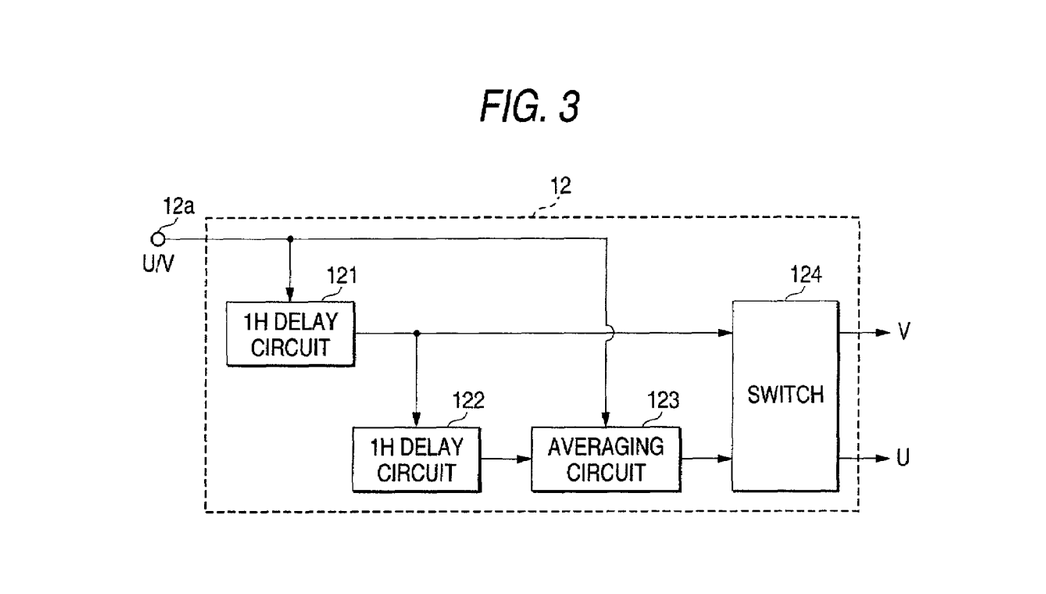
FIG. 3 is a diagram showing the internal structure of a signal interpolator.

FIG. 3 is a detailed diagram showing the configuration of the signal interpolator 12 in FIG. 2. This configuration is the same as the one for the signal interpolator 21 of the image processing apparatus 20. The signal interpolator 12 includes: a 1H delay circuit 121 for fetching a color difference signal U/V received at an input terminal 12a and for delaying the color difference signal U/V for one horizontal scanning period (hereinafter referred to as 1H); a 1H delay circuit 122 for further delaying, by 1H, a signal output by the 1H delay circuit 121; an averaging circuit 123 for calculating the average value for the signal output by the 1H delay circuit 122 and for the color difference signal U/V input at the input terminal 12a, which will be described later; and a switching circuit 124 for changing the signal output by the 1H delay circuit 121 and the signal output by the averaging circuit 123 to output for each line a signal V and a signal U.

Figure 4:
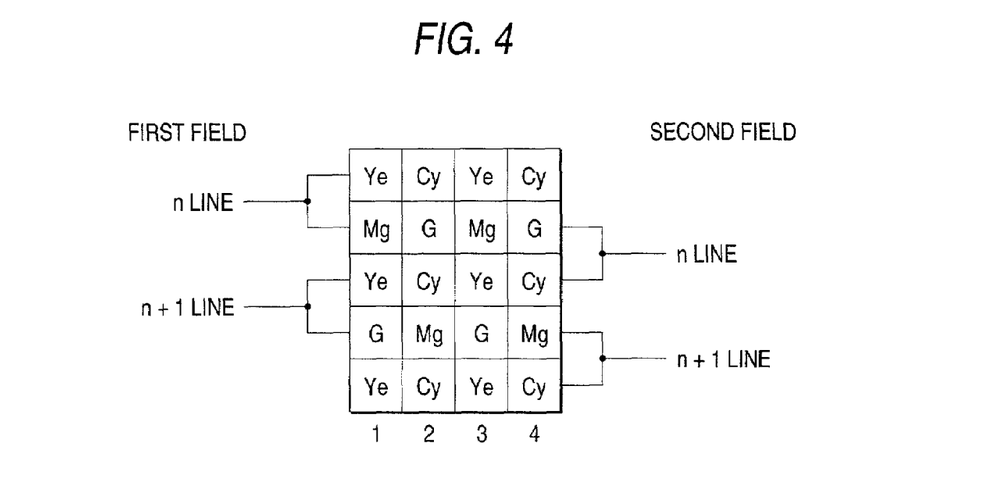
FIG. 4 is a diagram for explaining the image pickup element employed for a color difference line sequential system.

The operation of the thus arranged image processing system will now be described. An image is captured by the image pickup element 11 of the color difference line sequential system, and the luminance signal Y and the line sequential, color difference signal U/V are output. The image pickup element disclosed in Japanese Examined Patent Publication No. 6-28450 is employed as an example image pickup element 11 for the color difference line sequential system. And as is shown in FIG. 4, when, for the color difference line sequential system, an image is captured by the image pickup element 11, it first passes through yellow (Ye), magenta (Mg), cyan (Cy) and green (G) filters.

Figure 5A:
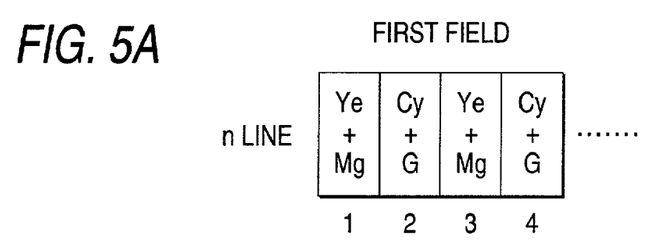
FIGS. 5A to 5D are diagrams for explaining a read signal transmitted by the image pickup element employed for the color difference line sequential system.
Figure 5B:
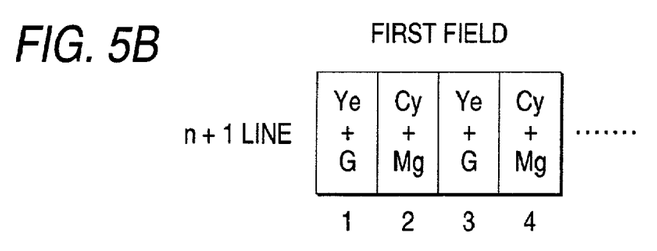
Figure 5C:
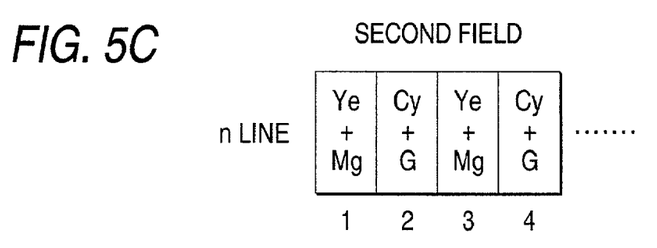
Figure 5D:
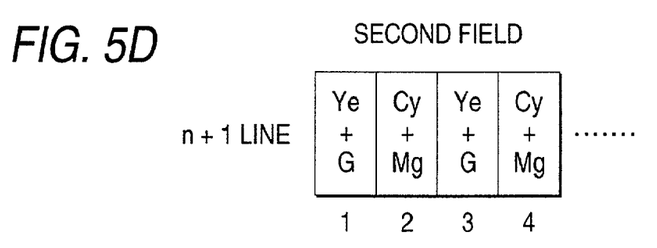

The image pickup element 11 performs the reading of two lines simultaneously, and outputs signals shown in FIG. 5A to the line n (an odd number) in the first field; i.e., signals Ye+Mg, Cy+G, Ye+Mg, Cy+G, . . . Similarly, signals in FIG. 5B are output for line n+1 (an even number) in the first field, signals in FIG. 5C are output for line n in the second field, and signals in FIG. 5D are output for line n+1 in the second field.

Based on the signals read from the image pickup element 11, a blue color difference signal U and a red color difference signal V are prepared by employing the following equations.

$$V = a(Ye+Mg) - b(Cy+G) \quad \text{(Ex.1)}$$

$$U = c(Cy+Mg) - d(Ye+G) \quad \text{(Ex.2)}$$

Figure 6:
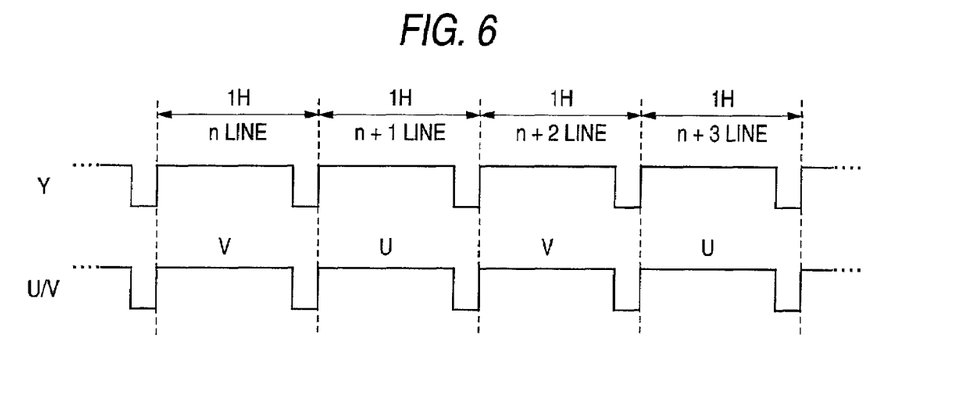
FIG. 6 is a diagram for explaining a line sequential, color difference output signal.

In these equations, a, b, c and d denote coefficients used in the white balance process. By using these equations, the signal V and the signal U are respectively prepared for the line n (an odd number) and for the line n+1 (an even number), and the signal U/V signal in FIG. 6 is generated for each line, through the employment of the line sequential process, and is output. The luminance signal Y is generated by using a low-pass filter for each line.

In this manner, the image pickup element 11 of the color difference line sequential system outputs the luminance signal Y and the line sequential, color difference signals U/V. The color difference signals U/V are formed by alternately arranging the signal U and the signal V for each line, and are transmitted to the signal interpolator 12 of the image pickup apparatus 10. The signal interpolator 12 interpolates the received color difference signal U/V, and separates it, in the following manner, into the two types shown at the lower portion in FIG. 6: a signal composed of the signals U for all the lines and a signal composed of the signals V for all lines.

Figure 7A:
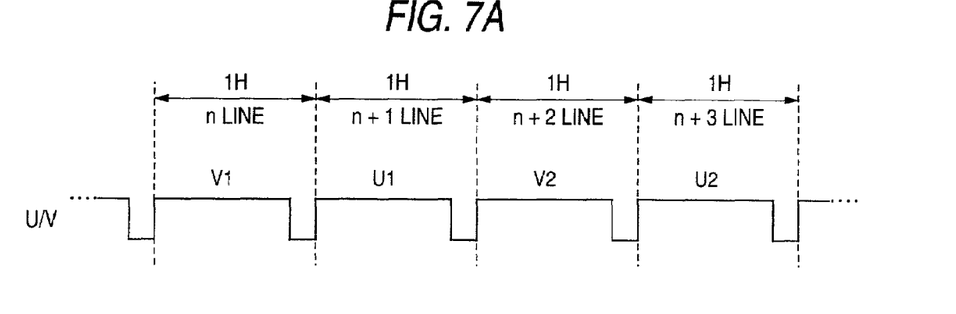
FIGS. 7A and 7B are diagrams for explaining a signal interpolation method.
Figure 7B:
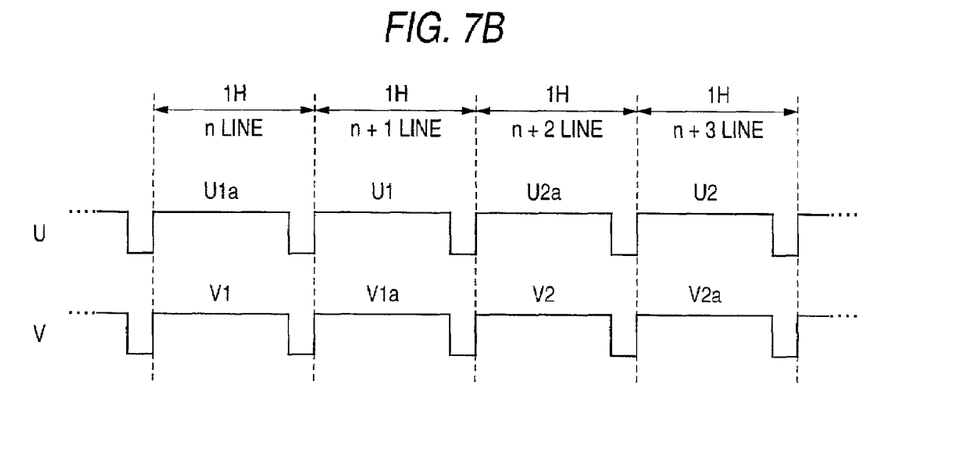

Example signals obtained by the signal interpolator 12 are shown in FIGS. 7A and 7B. In FIG. 7A are shown line sequential, color difference signals U/V before interpolation; and in FIG. 7B are shown the signals U and the signals V that are generated by separating the color difference signals U/V that are interpolated. As is shown in FIG. 7A, before interpolation, the color difference signals U/V are formed by alternately arranging for every 1H a signal U and a signal V, and for each line, only a signal U or a signal V is provided. These color difference signals U/V are interpolated to generate signals V for lines for which only signals U are present, and signals U for lines for which only signals V are present. Thus, as is shown in FIG. 7B, signals are generated for which signals U are present for all the lines and signals are generated for which signals V are present for all the lines. It should be noted that, in FIG. 7B, V1a, U1a, V2a and U2a are signals prepared through interpolation.

In this embodiment, the signal interpolator 12 generates signals through interpolation in the following manner. The 1H delay circuit 121 delays, by one line, the signal U/V that has been received at the input terminal 12a of the signal interpolator 12 in FIG. 3 and has not yet been interpolated. Then, the signal for this line is interpolated by using signals for the preceding and succeeding lines. That is, when a signal to be interpolated is a signal U1 for the line n+1 in FIG. 7A, this signal is interpolated by respectively using signals V1 and V2 for the preceding line n and the succeeding line n+2, and the signal V1a that corresponds to the signal U for the line n+1 is generated. Specifically, the averaging circuit 123 generates an average value signal for the two signals, the signal V1 for the preceding line of the interpolation target that is used by the 1H delay circuit 122 and the signal V2 for the succeeding line of the interpolation target, that are received at the input terminal 12a. The obtained average signal is then defined as the interpolated V signal V1a. The same interpolation process is performed when the signal to be interpolated is the signal V, and the interpolated signal U is obtained by using the signals U for the preceding and succeeding lines.

The switching circuit 124 replaces a signal for the pertinent line in the signals received as interpolation targets from the 1H delay circuit 121 with the interpolated signal U and the interpolated signal V that are received from the averaging circuit 123. Then, as is shown in FIG. 7B, signals consisting of the signals V and signals consisting of the signals U are generated and output for all the lines.

In this embodiment, the interpolation process has been performed by using signals for the preceding and succeeding lines of the interpolation target line. However, another interpolation method may be employed, such as a method that employs only a signal for either a preceding or a succeeding line.

The video signal processor 13 of the image pickup apparatus 10 adjusts the video signal based on the luminance signal Y, and the all-line V signal and the all-line U signal, which are output by the signal interpolator 12. In this case, the white balance process is performed, and as a result, three signals (a luminance signal Y, a signal V and a signal U) are output.

Conventionally, the three signals output by the video signal processor 13 are converted into three signals, such as RGB signals. In this embodiment, however, in order to reduce the number of output signal lines required by the image pickup apparatus 10, of the signals output by the video signal processor 13, the signals V and U are transmitted to the line sequential device 14 for the performance of the line sequential process. The resultant line sequential signal U/V, together with the luminance signal Y, is output by the video signal processor 13 to the image processing apparatus 20. In this manner, only the two signal types are output.

Specifically, the line sequential device 14 outputs either the signal V or the signal U with switching the signal V and the signal U for every 1H. In this manner, the signal U/V is generated, wherein the signal V and the signal U are arranged in the line sequential order. In this embodiment, the signal to be output is either the signal V or the signal U for the line that was present during the output process by the image pickup element 11. For an odd numbered line, the signal V is output and for an even numbered line, the signal U is output. In other words, the signal that is abandoned (the interpolated V signal or the interpolated U signal) is the one for the line that was not present during the output process by the image pickup element 11 and that is inserted by the signal interpolator 21.

In this embodiment, the signal that was present during the output process by the image pickup element 11 has been maintained, and the line sequential process has been performed while the signal inserted by the signal interpolator 12 was removed. However, the line sequential process may also be performed while the signal prepared by the signal interpolator 12 is maintained. In this case, since part of the video data fetched by an image pickup element, such as a CCD, has to be removed, the vertical resolution of the color difference signal is reduced; but as for the perceived effect, any error in the signal is dispersed and is less discernable.

Through this processing, the luminance signal Y and the line sequential color difference signal U/V are output by the image pickup apparatus 10 to the image processing apparatus 20. Of the video signals input to the image processing apparatus 20, the color difference signal U/V is fetched to the signal interpolator 21, and the signal V and the signal U are regenerated for each line. Since the operation of the signal interpolator 21 is the same as the operation of the signal interpolator 12, no further explanation for it will be given.

The signal converter 22 of the image processing apparatus 20 converts the luminance signal Y and the signals V and U that are generated by the signal interpolator 21. After this conversion, the signal form should match the input form for the image display device 23 at the succeeding stage, which receives the video signal produced by the signal converter 22 and displays it on a screen.

As is described above, according to the present invention, since the luminance signal and the line sequential, color difference signal are employed to transmit to the image processing apparatus video signals emitted by the image pickup apparatus, the types and number of required transmission paths can be reduced to two, without having to reduce the amount of video data obtained by an image pickup element, such as a CCD. As a result, a reduction in the number of signal lines and in the required installation space can be implemented.

Figure 8:
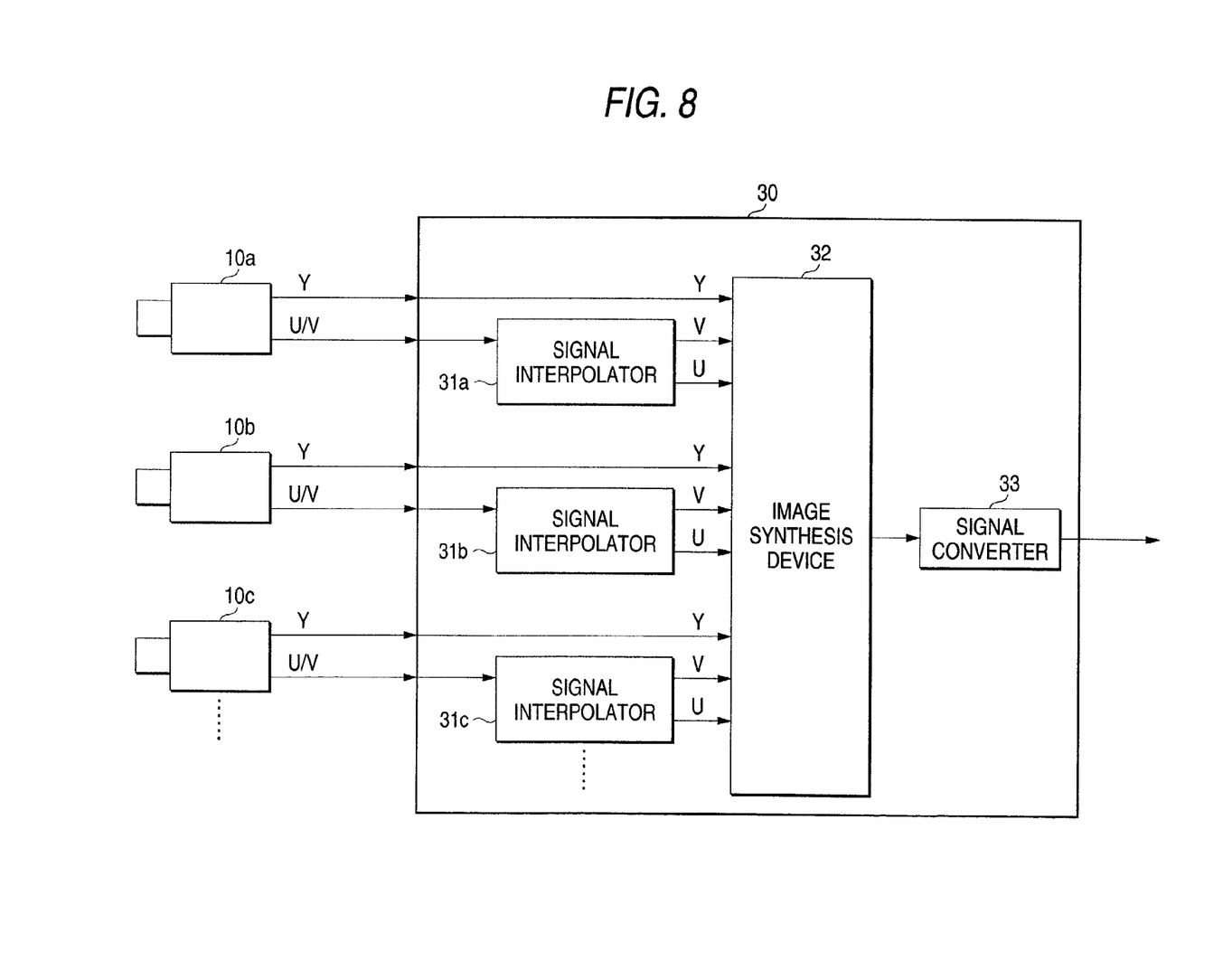
FIG. 8 is a block diagram showing an image processing system according to a second embodiment of the present invention.

FIG. 8 is a diagram showing the configuration of an image processing system according to a second embodiment of the present invention. For the image processing system in this embodiment, multiple image pickup apparatuses are connected to an image processing apparatus. That is, multiple image pickup apparatuses 10a, 10b, 10c, . . . are connected to an image processing apparatus 30, which includes: signal interpolators 31a, 31b, 31c, . . . for fetching color difference signals U/V from the image pickup apparatuses 10a, 10b, 10c, . . . ; an image synthesis device for fetching luminance signals Y from the image pickup apparatuses 10a, 10b, 10c, . . . and signals U and V from the signal interpolators 31a, 31b, 31c, . . . ; and a signal converter 33.

The configuration employed for all the image pickup apparatuses 10a, 10b, 10c, . . . is the same as the one in FIG. 2 for the first embodiment, and the configuration employed for the signal interpolators 31a, 31b, 31c, . . . is the same as the one for the signal interpolator 21 in the first embodiment.

The image processing system in this embodiment employs the image pickup apparatuses 10a, 10b, 10c, . . . to capture images. As in the first embodiment, each of the image pickup apparatuses 10a, 10b, 10c, . . . outputs, to the image processing apparatus 30, the luminance signal and the line sequential, color difference signal U/V as video signals. But since only two signal transmission output paths are required for each image pickup apparatus, the total number of signal lines can be reduced.

Of the video signals transmitted to the image processing apparatus 30 by the image pickup apparatuses 10a, 10b, 10c, . . . the line sequential, color difference signal U/V is interpolated by the signal interpolators 31a, 31b, 31c, . . . , which correspond to the image pickup apparatuses 10a, 10b, 10c, . . . , and is separated into signals consisting of V signals for all the lines and signals consisting of U signals for all the lines.

The luminance signals Y, which are obtained by the image pickup apparatuses 10a, 10b, 10c, . . . , and the color difference signals V and U, which are obtained by the signal interpolators 31a, 31b, 31c, . . . , are subsequently transmitted to the image synthesis device 32. And in accordance with the predetermined synthesis rule, the image synthesis device 32 synthesizes multiple images obtained by the image pickup apparatuses 10a, 10b, 10c, . . . , and outputs the synthesized image signals to the signal converter 33. Thereafter, the signal converter 33 converts the synthesized image signals, received from the image synthesis device 32, into video signals that are suitable for a succeeding process, such as image display or recording or some other image processing procedure, and outputs the converted video signals.

According to the second embodiment, since the number of signal lines required for the connection of the image pickup apparatuses and the image processing apparatus is reduced, it is easy to construct a system wherein multiple image pickup apparatuses can be installed in a small space, such as that which is available inside a vehicle. Furthermore, since image data deterioration is suppressed, a high quality image can be displayed.

According to the present invention, since the luminance signal and the line sequential, color difference signal are employed to transmit video signals from the image pickup apparatus to the image processing apparatus, the number of transmission paths employed for each image pickup apparatus can be reduced to two, without a reduction in the amount of video data obtained by the image pickup apparatus being required. Further, the number of circuits provided for the image pickup apparatus and the input/output portions of the image processing apparatus can also be minimized.

What is claimed is:

1. An image processing system comprising:
   an image pickup apparatus including an image pickup element for a color difference and line sequential system, and outputting a video signal as a luminance signal and a line sequential color difference signal; and
   an image processing apparatus including a signal interpolator for interpolating the line sequential color difference signal received from said image pickup apparatus to separate the line sequential color difference signal into two color difference signals;

wherein said image pickup apparatus includes:
- a signal interpolator for interpolating the line sequential color difference signal output by the image pickup element;
- a video signal processing device for adjusting the interpolated color difference signals; and
- a line signal device for performing a line sequential process for the adjusted color difference signals.

2. The image processing system as claimed in claim 1, wherein said image processing apparatus includes an image display device that uses the luminance signal and the interpolated color difference signals.

3. The image processing system as claimed in claim 1, wherein said line sequential process removes the signal prepared in said signal interpolator.

4. An image processing system comprising:
- a plurality of image pickup apparatuses, each of said plurality of image pickup apparatus including an image pickup element of the color difference line sequential system and outputting a video signal as a luminance signal and a line sequential color difference signals; and
- an image processing apparatus including:
  - signal interpolator for receiving the video signals from said plurality of image pickup apparatus, interpolating the line sequential color difference signals to separate each of the line sequential color difference signals into two color difference signals; and
  - an image synthesis device for synthesizing video data obtained from said plurality of image pickup apparatuses by using said color signals acquired by said signal interpolator wherein said image pickup apparatus includes:
- a signal interpolator for interpolating the line sequential color difference signal output by the image pickup element;
- a video signal processing device for adjusting the interpolated color difference signals; and
- a line sequential device for performing a line sequential process for the adjusted color difference signals.

5. The image processing system as claimed in claim 4, wherein said line sequential process removes the signal prepared in said signal interpolator.

6. An image pickup apparatus on which an image pickup element of a color difference line sequential system is mounted, comprising:
- a signal interpolator for interpolating a line sequential color difference signal received from the image pickup element to separate the color difference signal into two color difference signals;
- a video signal processing device for adjusting the two color difference signals; and
- a line sequential device for performing a line sequential process for the adjusted two color difference signals to obtain one color difference signal.

* * * * *